April 11, 1939.  C. E. JONES  2,153,869
FLOAT FOR FISHING LINES
Filed Nov. 3, 1937  2 Sheets-Sheet 1
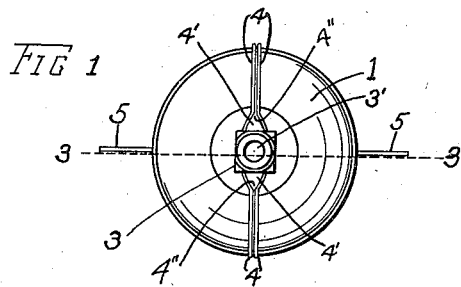
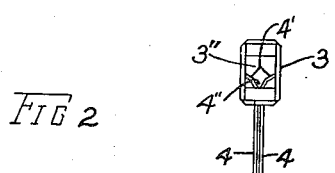
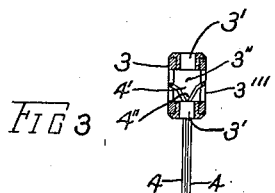
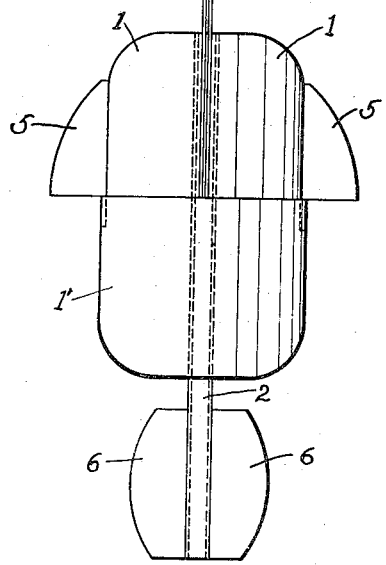
Inventor
Clarence E. Jones
By Staley & Welch
Attorney April 11, 1939.  C. E. JONES  2,153,869
FLOAT FOR FISHING LINES
Filed Nov. 3, 1937  2 Sheets-Sheet 2
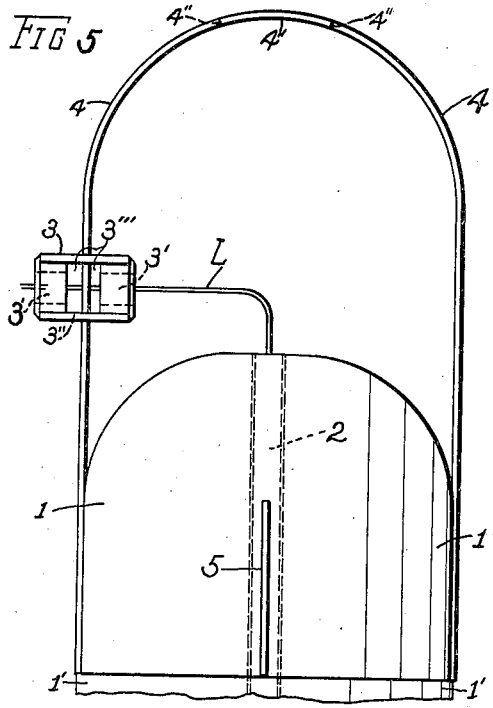
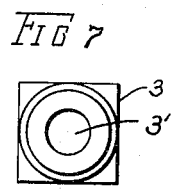
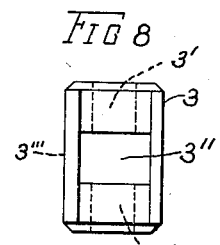
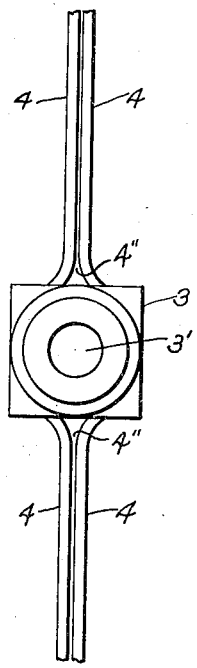
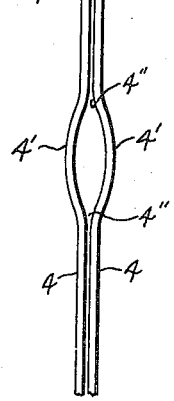
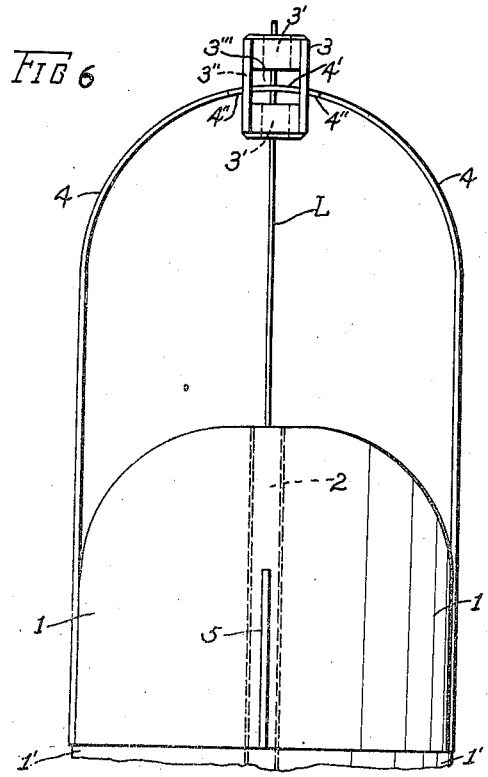
Clarence E. Jones, Inventor
By Staley & Welch, Attorneys Patented Apr. 11, 1939

2,153,869

UNITED STATES PATENT OFFICE 2,153,869

FLOAT FOR FISHING LINES

Clarence E. Jones, Springfield, Ohio

Application November 3, 1937, Serial No. 172,506

6 Claims. (Cl. 43—49)

This invention relates to floats for fishing lines, it more particularly relating to a float used in casting.

One of the objects of the invention is to provide simple and effective means whereby the float may be clamped to the line after a certain length of the hook end of the line has been played out after the cast.

A further object of the invention is to provide simple and effective means for releasing the float from the line in reeling up after a fish has been caught or in reeling up preparatory to making a new cast.

A further and more specific object of the invention is to provide a simple and effective means for clamping the float to the line after a cast has been made by a manipulation of the line in the nature of a jerk upon the line from the pole end of the line.

A further and more specific object is to provide means for releasing the float from the line in reeling in the line by a manipulation of the line in the nature of a jerk on the pole end of the line.

A further object of the invention is to provide the float with means whereby a water resistance is afforded to assist in properly positioning the float when the line is manipulated by jerks so as to effectively position the line clamping device, either in casting or reeling in.

In the accompanying drawings:

Fig. 1 is a top plan view of a float embodying the improvements, the line-actuated member of the clamping devices for the float and line being in inoperative position.

Fig. 2 is a side elevation of the same.

Fig. 3 is a vertical section on the line 3—3 of Fig. 1.

Fig. 4 is a bottom plan.

Fig. 5 is a side elevation of the upper portion of the float and the line clamping devices looking at the opposite side from that shown in Fig. 2, and showing the line and float clamped together.

Fig. 6 is a view similar to Fig. 5 but showing the float released from the line.

Fig. 7 is a top plan view of the line-actuated member of the clamping devices.

Fig. 8 is a side elevation of the line-actuated member of the clamping devices.

Fig. 9 is a top plan view of the line-actuated member showing the same assembled upon the line clamping device proper.

Fig. 10 is a top plan view of a portion of the line clamping device.

The float is so designed that it will permit the line, after the float rests upon the water after a cast has been made, to pass freely through the float until the fisherman thinks the proper depth for the hook has been reached, and then by a jerk on the line the float may be automatically clamped to the line. Further, in reeling in the line in the event that a fish has been caught or it is desired to make a new cast the float will be automatically released from the line by another jerk upon the line.

In the present case the float proper consists of a water-tight hollow metallic body, preferably formed of two parts 1 and 1' soldered together, although the float may be made of cork, wood or any other suitable material. The float has extending centrally therethrough a tube 2 which acts as a channel to guide the line, indicated at L. The line, before it is passed through the tubular guide, is threaded through a small head 3, this head having a vertical aperture 3' to receive the line. This head is slidably mounted upon the line locking device proper and for that purpose is provided with a transverse aperture 3''.

The clamping device proper consists of a pair of curved spring wires 4 carried by the upper end of the float, the ends of the wires being preferably soldered to the wall of the float. These wires are positioned closely together save at their intermediate points where they are spaced apart as indicated at 4'. These spaced-apart portions 4' are curved so as to provide converging throats 4''. The distance between the outer sides of the spaced-apart portions 4' is slightly greater than the width of the transverse aperture 3'' of the head 3 and the sides of the head are preferably cut away as indicated at 3''' to accommodate the spaced-apart portions 4'.

By this arrangement when the head is positioned centrally of the line clamping device as shown in Figs. 1, 2, 3, 6 and 9 it will be held in frictional engagement with the spaced apart portions 4' of the spring clamping wires 4, with the aperture 3' aligned with the tube 2, so that the line, in casting out, will pass freely through the float. When the float rests upon the water and a sufficient amount of the line in the judgment of the fisherman has been played out, the fisherman by a jerk on the line removes the head 3 from its frictional engagement with the bent out portions 4' and causes it to slide down the clamping wires 4 to the position shown in Fig. 5, with a portion of the line drawn between the wires, which serves to clamp the line and float together to such an extent that no further playout of the line is permitted.

When the line is jerked, in the event that the strain upon the line should be at right angles or substantially so to the clamping wires 4, the first pull upon the line causes the float to be turned in the water so as to bring the strain upon the line in the direction of the space between the clamping wires 4 so that the head 3 will slide readily along the wires and draw the line therebetween. This may be in one direction or the other from the central spaced-apart portion 4'.

In order that the float may be controlled in this turning movement in the water it is provided with two side fins 5 secured to the body of the float and with a pair of lower fins 6 which are secured to the lower end of the guide tube 2, which is projected beyond the lower portion of the float, these fins acting as a water resistance.

When the fisherman draws in the line in the event that a fish is caught or he wishes to make a new cast the tension on the line will cause the head 3 to again slide up the wires and assume its central position, thus releasing the line from the float so that there is no pull-in on the float until it is gathered up by the sinker on the hook-end of the line.

By this arrangement a very simple and effective line-actuated means is provided for not only securing the float to the line in casting out after in the judgment of the fisherman a sufficient amount of the hook end of the line has been played out but also for immediately releasing the line from the float in reeling in. Further, it will be noted that the float is applicable to any sized line and that no adjustments between the line and float are required.

Having thus described my invention, I claim:

1. In a fishing line float, a float having a channel to permit the free passage of the fishing line therethrough, of a pair of spring clamping members carried by said float, and a line actuated member operated by a jerk on the line to position the line between said spring clamping members in casting out and by another jerk on the line to release the line from said spring clamping members in pulling in.

2. In a fishing line float, a float having a channel to permit the free passage of the fishing line therethrough, of a pair of curved spring clamping members, said spring clamping members lying close together save at their central point where they are spaced apart, and a line operated head slidably mounted upon said spring clamping members adapted to be normally held in frictional engagement with the spaced-apart portions of said clamping members, said head having a perforation to receive the line and to be actuated thereby whereby a jerk upon the line will cause said head to draw the line between said spring clamping members to clamp the line and float in casting out and another jerk upon the line will cause said head to be again positioned upon said spaced-apart portions to withdraw the line from said spring clamping members.

3. In a fishing line float, a float having a channel therethrough to permit the free passage of the fishing line, a pair of spring clamping members carried by said float, a line actuated member slidably mounted on said spring clamping members, and means to hold said line actuated member in a central position on said spring clamping members, an aperture through said line actuated member which in the central position of said member is aligned with the channel through said float, said line actuated member by a jerk on the line being adapted to be slid upon said spring clamping members so as to draw the line therebetween to clamp the float and line together and by a subsequent jerk upon the line adapted to be restored to its central position to release the line and float.

4. In a fishing line float, a float having a channel to permit the free passage of the fishing line therethrough, of a clamping device to clamp the line to the float, a line actuated member carried by said clamping device and slidable thereon to clamp the line to the float in casting out by a jerk upon the line and to release the line from said clamping device by another jerk upon the line in pulling in, and a plurality of fins upon said float to act as a water resistance when jerks are applied to said line actuated member.

5. In a fishing line float, a float body, a pair of spring clamping members having their clamping portions closely positioned together and carried by said body, and a line operated device slidably mounted upon said spring clamping members having a perforation through which the line passes whereby when the line is jerked said device will be caused to slide upon said clamping members and draw the line therebetween.

6. In a fishing line float, a float having a channel to permit the free passage of the fishing line therethrough, of a clamping device to clamp the line to the float, and a line-actuated member operated by a jerk on the line to cause the same to clamp the line to the float after casting out and by another jerk on the line to release the line from the float in pulling in.

CLARENCE E. JONES.